United States Patent
Gupta et al.

(10) Patent No.: US 11,210,308 B2
(45) Date of Patent: Dec. 28, 2021

(54) METADATA TABLES FOR TIME-SERIES DATA MANAGEMENT

(71) Applicant: Ayla Networks, Inc., Santa Clara, CA (US)

(72) Inventors: Pankaj Gupta, Santa Clara, CA (US); Haoqing Geng, Fuyang (CN); Sudha Sundaresan, San Jose, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 1142 days.

(21) Appl. No.: 15/154,135

(22) Filed: May 13, 2016

(65) Prior Publication Data

US 2017/0329828 A1    Nov. 16, 2017

(51) Int. Cl.
*G06F 16/2458* (2019.01)
*G06F 16/9535* (2019.01)

(52) U.S. Cl.
CPC ...... *G06F 16/2477* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 2008/0104362 A1* | 5/2008 | Buros | ............. | G06F 12/1054 711/207 |
| 2009/0303676 A1* | 12/2009 | Behar | ............. | G06F 1/162 361/679.27 |
| 2010/0131533 A1* | 5/2010 | Ortiz | ............. | G06F 16/58 707/758 |
| 2014/0201332 A1* | 7/2014 | Kataoka | ............. | H04L 67/1008 709/219 |
| 2015/0035823 A1* | 2/2015 | Arsan | ............. | G06T 15/20 345/419 |
| 2016/0094681 A1* | 3/2016 | Wu | ............. | G06F 16/211 709/203 |

(Continued)

OTHER PUBLICATIONS

Madden, Samuel, et al., "The Design of an Acquisitional Query Processor for Sensor Networks", ACM Sigmod 2003, pp. 491-502. (Year: 2003).*

(Continued)

*Primary Examiner* — Scott A. Waldron
(74) *Attorney, Agent, or Firm* — Lowenstein Sandler LLP

(57) ABSTRACT

A metadata table manager receives a request for time series data associated with a device, where the request comprises a device identifier associated with the device, and where the time series data comprises a most recently received data element associated with the device. The metadata table manager determines a metadata table that associates the device identifier with one or more time periods during which data associated with the device has been received, and accesses a metadata table entry for the device identifier that includes an indication of a number of data elements received at the most recent time period of the one or more time periods. The metadata table manager queries a time series data store for the first time series data based on the first time period, and outputs a portion of the first time series data, wherein the portion at least comprises the most recently received data element.

20 Claims, 8 Drawing Sheets

| KEY | 01:00 | 01:01 | 02:00 | 03:01 | 03:10 |
|---|---|---|---|---|---|
| DEVICE ID 1: PROPERTY 1: 04/18/2016 12:00 | value = 10 | value =40 | | | |
| DEVICE ID 2: PROPERTY 2: 04/18/2016 12:00 | | | | value=79 | value=80 |
| DEVICE ID 1: PROPERTY 1: 04/18/2016 13:00 | | value=20 | value=23 | | |
| DEVICE ID 1: PROPERTY 1: 04/18/2016 14:00 | | value=30 | | | |
| DEVICE ID 1: PROPERTY 1: 04/19/2016 12:00 | value = 10 | value =40 | | | |
| DEVICE ID 1: PROPERTY 1: 04/19/2016 13:00 | | value=20 | value=23 | | |

TIME SERIES DATA
305

| KEY | 12:00 | 13:00 | 14:00 |
|---|---|---|---|
| DEVICE ID 1: PROPERTY 1: 04/18/2016 | 2 | 2 | 1 |
| DEVICE ID 1: PROPERTY 1: 04/19/2016 | 2 | 2 | |
| DEVICE ID 2: PROPERTY 2: 04/18/2016 | 2 | | |

METADATA TABLE
310

| KEY | 04/18/2016 | 04/19/2016 |
|---|---|---|
| DEVICE ID 1: PROPERTY 1 | 5 | 4 |
| DEVICE ID 2: PROPERTY 2 | 2 | |

METADATA TABLE
315

(56) References Cited

U.S. PATENT DOCUMENTS

2017/0032252 A1\* 2/2017 Feminella .............. G06Q 30/02
2017/0309046 A1\* 10/2017 Demiralp ............ G06F 3/04842

OTHER PUBLICATIONS

McLachlan, Peter, et al., "LiveRAC: Interactive Visual Exploration of System Management Time-Series Data", ACM CHI 2008, pp. 1483-1492. (Year: 2008).\*

Pelkonen, Tuomas, et al., "Gorilla: A Fast, Scalable, In-Memory Time Series Database", VLDB Endowment 2015, vol. 8, No. 12, pp. 1816-1827. (Year: 2015).\*

\* cited by examiner

METADATA TABLES FOR TIME-SERIES DATA MANAGEMENT

BACKGROUND

Many modern appliances, consumer devices, and other devices include embedded systems that are configured to perform one or more dedicated functions. Embedded systems of such devices that provide networking capabilities may periodically send requests to hosted applications that provide various support capabilities for the embedded systems.

Devices with embedded systems may be configured to send data elements to server computing devices of an Internet of Things (IoT) platform. Typically, IoT platforms handle large volumes of data being received from multiple embedded systems at variable rates. Time series data stores can be used to store data received from embedded systems in IoT platforms due to their scalability as well as performance advantages when receiving large volumes of data. However, searches for particular types of data created by Internet enabled devices in the time series data store can be time consuming and resource intensive.

BRIEF DESCRIPTION OF THE DRAWINGS

Reference will now be made to the accompanying drawings showing example embodiments of the present application.

DETAILED DESCRIPTION OF EMBODIMENTS

Figure 1:
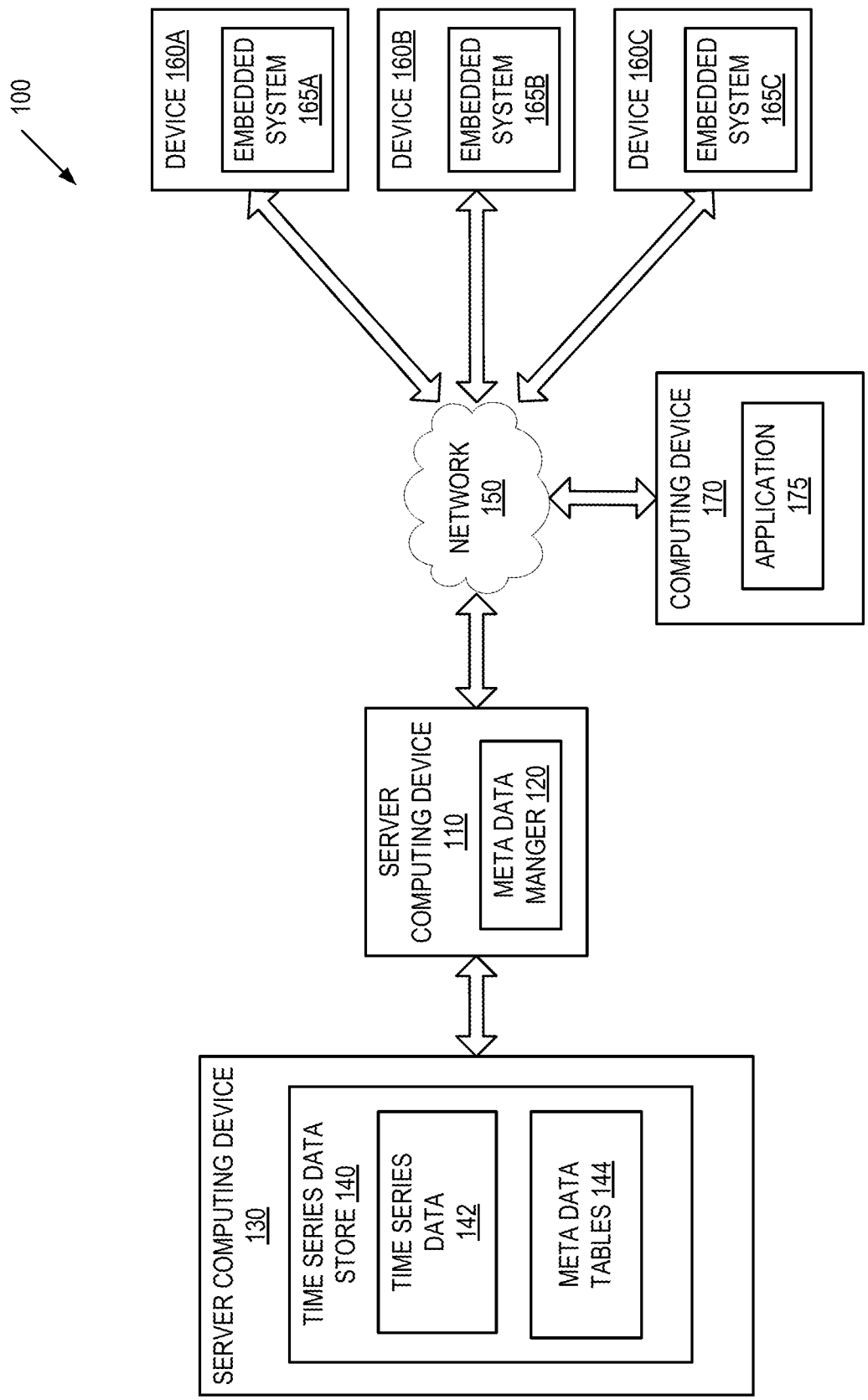
FIG. 1 is a block diagram depicting an example network architecture including a metadata manager for time-series data management, in accordance with an embodiment of the present disclosure.

Embodiments are directed to a metadata manager of a server computing device or other system that can use metadata tables for time series data management. Due to the unique scalability and performance requirements of IoT platforms, time series data stores can be used to accommodate high volumes of incoming data from devices with embedded systems. A time series data store is a data store that is optimized for handling time series data (a sequence of data points made over a continuous time interval or successive intervals). Time series data stores can include NoSQL data stores such as the Apache Cassandra® database. IoT platforms may often be write-heavy systems which are preferably able to handle large volumes of write operations that are received at variable rates. For example, a heating, ventilation, and cooling (HVAC) system that is always on can generate much more data than a smoke alarm, which may only generate data during the occurrence of a particular event (e.g., the presence of smoke).

Using time series data stores to manage large amounts of data can be beneficial for write operations. Data stores can be divided into multiple partitions based on time periods during which data may be received from devices with embedded systems. Data may be added to partitions as it is received without the overhead incurred by indexing operations that are commonly associated with relational data base systems. Using time series data stores, however, can lead to performance degradation during read operations since data may be spread across multiple partitions in the read path. Particularly, requests for data elements that have been most recently received from a device may experience added latency because each partition may need to be read in order to determine which data element is the most recently received.

The metadata manager described in embodiments herein can remedy this by creating and maintaining metadata tables that associate data in a time series data store with time periods during which data is received by devices with embedded systems. In one embodiment, each row in the metadata table is associated with (e.g., keyed on) a device ID and a property ID. The metadata manager may receive a request for time series data that includes a most recently received data element associated with a device and a particular property of the device. The request can include a device identifier associated with the device and can include a property identifier associated with the property. The metadata manager may identify a metadata table that associates the device identifier with one or more time periods during which data associated with the device has been received. The metadata manager may then access a metadata table entry for the device identifier and for a device property, where the metadata table entry includes an indication of the number of data elements received for that device property during a time period that is the most recent of the one or more time periods in the table. The metadata manager may then query the time series data store for the time series data based on the time period identified in the metadata table entry. The metadata manager may then output a portion of the time series data that includes at least the most recently received data element for the device property. In alternative embodiments, data may not be segregated on device properties. For example, entries for all device properties received in a time period may be represented in a particular entry of the metadata table.

Thus, the metadata tables associated with the time series data can facilitate efficient identification of data elements most recently added to a time series data store. Additionally, by configuring the metadata tables by time period as described herein, the metadata manager may also provide more efficient pagination of output of multiple data elements by using the data stored in the metadata tables to drive the amount of output provided.

Embodiments are described herein with reference to management of time series data produced by internet-of-things (IoT) enabled devices (referred to a network-connected devices or simply devices). However, it should be understood that the techniques, methods and systems described herein with reference to time series data from IoT enabled devices also apply to management of time series data generally, regardless of the source of the time series data.

Referring now to the figures, FIG. 1 is a block diagram depicting an example network architecture 100 including a metadata manager for time-series data management. The network architecture 100 can include one or more devices 160A-C that each may be connected to a server computing device 110 via network 150. The server computing device 110 can receive data elements from one or more of devices 160A-C and store the data elements in a time series data 142 in time series data store 140 of server computing device 130.

The devices 160A-C may be devices with embedded systems 165A-C, and may include, for example, electrical appliances such as refrigerators, ovens, washers, driers, dishwashers, thermostats, alarms, air conditioners, televisions, radios, receivers, amplifiers, and so forth. The devices 160A-C may also include consumer devices such as digital watches, music players, game consoles, digital cameras, printers, and so forth. Other examples of devices 160A-C include stationary devices such as HVAC systems, traffic lights, factory controllers, signs, electronic billboards, sprinkler systems, and irrigation control systems, as well as medical devices. Devices 160A-C may also be any other type of device that includes an embedded system 165A-C.

An embedded system 165A-C is a class of computing device that is embedded into another device 160A-C as one component of the device 160A-C. The device 160A-C typically also includes other hardware, electrical and/or mechanical components that may interface with the embedded system. Embedded system 165A-C is typically configured to handle a particular task or set of tasks, for which the embedded system 165A-C may be optimized. Accordingly, the embedded system 165A-C may have a minimal cost and size as compared to general computing devices.

Network 150 may include a router, switch, bridge or other network device (not shown) that enables communication between multiple devices (e.g., device 160A-C, computing device 170, etc.) connected to the network 150. The network device may provide wired connections to the LAN using, for example, Ethernet ports, universal serial bus (USB) ports and/or Firewire® ports. The network device may additionally provide wireless connections to the LAN using, for example, a Wi-Fi® transceiver. Network 150 may be a private WAN (e.g., an intranet) or a public WAN such as the Internet, or may include a combination of a private and public network. Network 150 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the network 150.

The server computing devices 110, 130 may include a physical machine and/or a virtual machine hosted by a physical machine. The physical machine may be a rackmount server, a desktop computer, or other computing device. In one embodiment, the server computing devices 110, 130 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 130 may include time series data store 140 which may, in turn, include time series data 142 and metadata tables 144. Time series data store 140 may be any data store capable of storing time-series data across one or more server computing device nodes. In some implementations, time series data store 140 may be an append only data structure. In some implementations, time series data store 140 may be a distributed database designed to support large amounts of data across multiple servers. For example, time series data store 140 may be an Apache Cassandra® database. In other embodiments, time series data store 140 may be any other type of NoSQL database (e.g., such as Apache Accumulo®, Hewlett Packard Vertica®, Apache HBase®, or the like). Time series data 142 and metadata tables 144 may be stored in the same data base 140 on the same server computing device 130. Alternatively, time series data 142 and metadata tables 144 may be stored on different server computing devices.

Time series data 142 may store data sent by one or more of embedded systems 165A-C to server computing device 110. For example, a thermostat in a home or office may send information monitored within the home or office (e.g., monitored temperature, heating/cooling settings, etc.) to a weather application (not pictured) to be analyzed in light of weather conditions in the area. The information received from the thermostat may then be stored in time series data 142. In an illustrative example, time series data 142 may be stored as a partition (or series of partitions) in an Apache Cassandra® database where an entry has a primary key that associates a unique device identifier with a time period during which the data element was received a date/timestamp down to the hour). Any data elements received may be stored in "columns" of the time series data store that are divided by minute and second (MM:SS) that the data element is received or that the data element is generated. An example structure of the time series data 142 is described in further detail below with respect to FIG. 3.

In some implementations, the entries in time series data 142 may have a primary key that also includes a property of the device (in addition to the device ID). A device property may be any attribute of or function performed by the device that can cause the device to send a data point to be stored in time series data 142. For example, properties of a thermostat device may include a temperature setting, a current temperature measurement, a command that causes an air conditioner/heater to begin cooling/heating a room, a command issued by a particular button press, or the like. The property may be stored using a property name (e.g., "temperature setting"), a unique identifier (e.g., a numeric, alphanumeric, or symbolic identifier, etc.), or in any similar manner. In some implementations, properties can be unique within a particular device. Additionally, different devices of a similar class of devices (e.g., a particular model of thermostat) may each include a similar set of properties and/or different sets of properties. Thus, each entry in time series data 142 may contain a data element associated with a particular device property received during a particular time period.

Metadata tables 144 may be used to efficiently manage time series data 142 that contains very large amounts of data. In embodiments, metadata tables 144 may be co-located on the same server computing device 130 as the associated time series data 142. Alternatively, metadata tables 144 may be stored on a different server computing device 130 (e.g., a different node of a multi-node distributed data management system), or on the server computing device 110 that includes metadata manager 120. In an illustrative example, metadata tables 144 may be stored as a partition (or series of partitions) in an Apache Cassandra® database where an entry has the unique device identifier as the primary key. In some implementations, the entry in metadata tables 144 may have a primary key that also includes a property of the device.

Accordingly, the primary key may be a tuple that includes the device ID and the property ID. The metadata table "columns" may be divided by the time period during which data elements have been received (e.g., the date/timestamp down to the hour that may be used as time period component of the primary key in the time series data 142 noted above), where each "cell" in the table can include an indication of the number of data elements received from the device associated with the device identifier (or the device identifier and property combination) during the time period.

The metadata table 144 can be used to efficiently determine the most recently received data elements for a particular device identifier (or a particular device identifier and property combination) by identifying the most recently added "column" in the metadata table for the device. Additionally, the metadata table 144 may be used to control pagination operations of applications 175 that may request time series data for a device from the time series data 142 by using the number of data elements stored in the metadata tables 144 for a particular time period (or series of time periods). An example structure of the metadata tables 144 is described in further detail below with respect to FIG. 3.

Server computing device 110 can include a metadata manager 120 to store data received from embedded systems 165A in time series data 142, as well as maintain metadata tables 144 for time-series data management. In some alternative implementations, server computing device 110 may include additional components (not pictured) that may receive data elements from devices 160A-C (or the embedded systems 165A-C on those devices), store the received data elements in time series data 142, and subsequently invoke metadata manager 120 to update and/or maintain metadata tables 144.

In embodiments, metadata manager 120 can receive a new data element from device 160A (or the embedded systems 165A on that device). Metadata manager may then store the new data element in an entry in the time series data 142. In some implementations, the entry in the time series data 142 may be associated with the device identifier of device 160A (e.g., a unique identifier associated with the individual device 165, or a component of device 165, such as a device serial number, MAC address, Internet Protocol (IP) address of the device, etc.), as well as the time period (e.g., a date/timestamp) that the data element was received by server computing device 110. In some implementations, the entry in the time series data 142 may also be associated with a property of device 160A (e.g., an attribute of device 160A, a function performed by device 160A, etc.). Metadata manager 120 may then either store a new entry in metadata tables 144 or, if an entry already exists in metadata tables 144 for the device at that time period, increase the indication of the number of data elements for the entry.

Metadata manager 120 may subsequently receive a request for time series data associated with the device from time series data 142. In embodiments, the request may include the device identifier associated with the device, and may request the most recently received data element associated with the device. The request may also include a particular property of the device. For example, the request may be for a temperature setting for a particular thermostat device. The request may also be for current values for one or more device property associated with the device. For example, the request may be for the current settings associated with a particular thermostat device (e.g., the most recent temperature measurement, the most recent temperature setting, etc.).

In some implementations, the request may be received from an application 175 executing on computing device 170. Metadata manager 120 may identify a metadata table 144 that associates the device identifier (or the device identifier and property combination) with one or more time periods during which data associated with device has been received. Metadata manager 120 may then access the metadata table 144 to obtain the indication of the number of data elements received from the device at a time period that is a most recent time period of the one or more time periods stored in the metadata table 144. In implementations where the request is for current values of each device property associated with the device, metadata manager 120 may perform multiple accesses of metadata table 144. Each of the accesses may be associated with a separate device property for the device, and can return the most recent time period during which data associated with that device property has been received.

In some implementations, the most recent time period can be the time period that is closest in time to the time of the request. Alternatively, the most recent time period may be the time period associated with the last data element received from the device. For example, a metadata table entry for a device whose last column in the metadata table entry stores a time period from a week prior to the time of the request may represent the most recent time period if that was the last time that the device sent any data to server computing device 110.

Metadata manager 120 may then query time series data 142 for the associated time series data using the time period identified by the metadata table entry. In some implementations, metadata manager 120 may build a query key that includes the device identifier from the request, and the most recent time period from the last entry in the metadata table 144 to access the associated time series data from the time series data 142. In some implementations, metadata manager 120 may build a query key that includes the device identifier and the device property from the request, and the most recent time period from the last entry in the metadata table 144 to access the associated time series data from the time series data 142. In such implementations, metadata table manager 120 may query time series data 142 for each of the device properties associated with the device.

Metadata manager 120 may then output a portion of the time series data retrieved from time series data 142, where the portion at least comprises the most recently received data element from the device. In implementations where the request is for the current values of each device property associated with the device, metadata manager 120 may output the most recently received data element for each of the device properties associated with the device.

In some implementations, metadata manager 120 may also utilize metadata tables 144 to optimize pagination of time series data when outputting multiple data elements to a requesting device, application, etc. If an application 175 on computing device 170 requests time series data for device 160A, metadata manager 120 may determine that there are multiple data elements that have been received from device 160A during the most recent time period (or time periods). For example, the request for the time series data may specify the 100 most recent data elements received from a device. Metadata manager 120 may determine a threshold number of data elements associated with the output. For example, if the request is received from an application 175 on computing device 170 that has a maximum page size of 50 for the device display, metadata manager 120 may determine the threshold to be the maximum page size. Metadata manager may then determine that the indication of the number of data elements from the metadata table entry is greater than the threshold number, and subsequently select the portion of the time series data that includes not more than the threshold number of data elements. Thus, metadata manager 120 may select 50 data elements to be output to the requesting computing device 170.

Computing device 170 may include portable devices such as electronic book readers, portable digital assistants, mobile phones, laptop computers, portable media players, tablet computers, cameras, video cameras, netbooks, notebooks, and the like. Computing device 170 may also include traditionally stationary devices such as desktop computers, gaming consoles, digital video disc (DVD) players, media centers, and the like. Computing device 170 may connect to network 150 to interface with time series data store 140. In an illustrative example, if the computing device 170 is a mobile phone, then the computing device 170 may connect to the network 150 using a Wi-Fi® radio. The computing device 170 may connect to network 150 through a connection with a wireless carrier system (e.g., though a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection).

Computing device 170 can include an application 175. The application 175 may be a module that executes locally on computing device 170. Alternatively, the application 175 may be mobile browser application that can execute a web-based application to access time series data store 140. In one embodiment, the computing device 170 may include separate applications 175 for each of the embedded systems 165 of any devices in the network.

Although for simplicity, FIG. 1 depicts a limited number of devices 160 with corresponding embedded systems 165, a single server computing device 130, a single time series data store 140, a single time series data 142 and a single metadata tables 144, it should be understood that network architecture can include one or more of each component. For example, though three devices with embedded systems are shown for clarity of explanation, the number of devices may be as large as millions, tens of millions, or even more.

Figure 2:
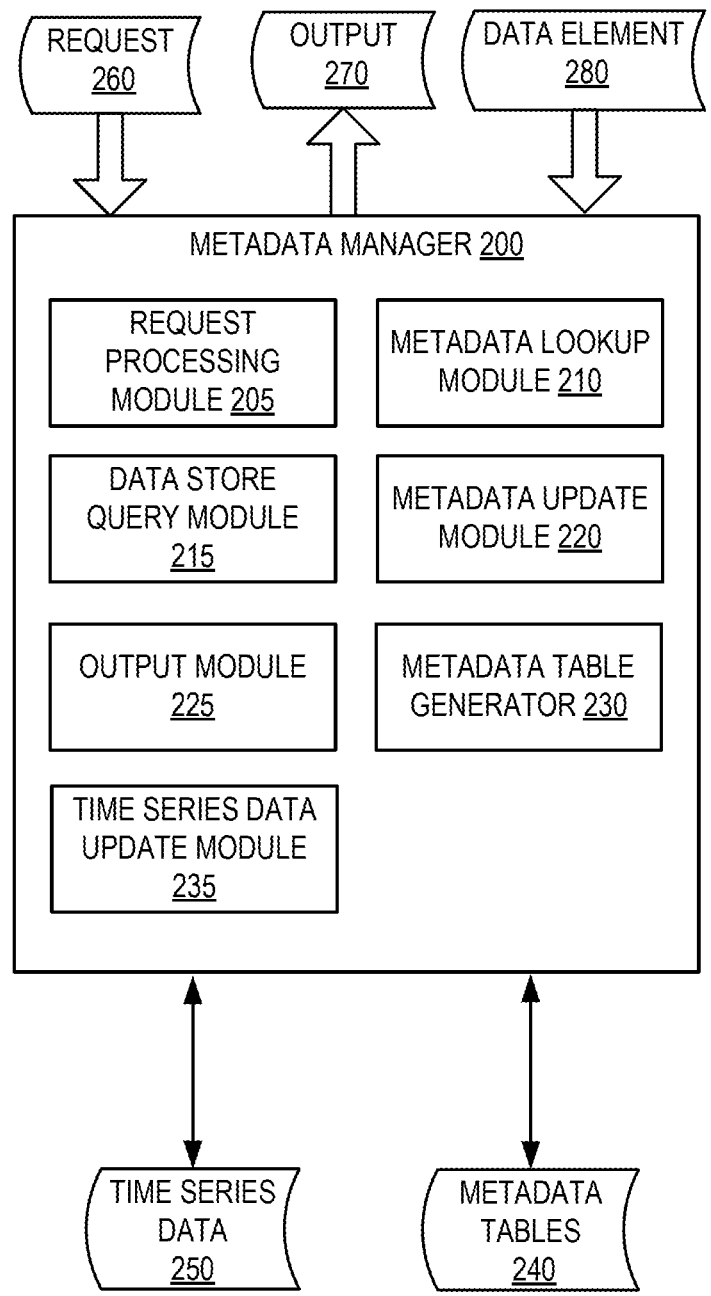
FIG. 2 is a block diagram of an example embodiment of a metadata manager that performs time-series data management, in accordance with an embodiment of the present disclosure.

FIG. 2 is a block diagram of an example embodiment of a metadata manager 200, which in one embodiment corresponds to metadata manager 120 of FIG. 1. Metadata manager 200 may additionally include request processing module 205, metadata lookup module 210, data store query module 215, metadata update module 220, output module 225, metadata table generator 230, and time series data update module 235. Alternatively, the functionality of one or more of the request processing module 205, metadata lookup module 210, data store query module 215, metadata update module 220, output module 225, metadata table generator 230, and time series data update module 235 may be combined into a single module or divided into multiple sub-modules. Metadata manager 200 may be included on the same sever computing device as time series data 250 and metadata tables 240, or may be included on a separate server computing device.

Request processing module 205 is responsible for receiving requests 260 (from devices, applications, etc.) to provide data elements stored on time series data 250. In some implementations, requests 260 may be received from devices such as computing device 170 of FIG. 1. Request processing module 205 may also be responsible for receiving data elements to be added to time series data 250. In embodiments, the data elements can include device data points (e.g., temperatures for a thermostat), device status updates, device states, device settings, communication acknowledgements, image files, image file properties (e.g., image size, resolution, etc.), user related information, or the like. Data elements may be of various types (e.g., Boolean, decimal, integer, string, floating point, etc.). In some implementations, the devices that send the data elements may be devices with embedded systems, such as devices 160A-C of FIG. 1.

In an illustrative example, request processing module 205 may receive data elements 280 from a device with an embedded system at a particular time. In some implementations, data elements 280 may be received periodically from a device. A device may send data elements 280 upon occurrence of a particular event (e.g., a smoke detector may send data elements 280 only when smoke has been detected by the device), upon detection of a particular status (e.g., a home alarm system may send data elements 280 when the system has been enabled or disabled), upon the expiration of a time interval (e.g., a device may send status updates every hour), or the like. In some implementations, data elements 280 may be received from a device continuously (e.g., an HVAC device that is always on). Request processing module 205 may then invoke time series update module 235 to store the new data element in an entry in the time series data 250. The entry in the time series data 250 may be associated with a device identifier (or the device identifier and property combination) of the device, as well as the time period during which the data element 280 was received by metadata manager 200. Time series update module 235 may construct a key using the device identifier (or the device identifier and property combination) from the request, and append the time period information and update time series data 250 accordingly.

Request processing module 205 may then invoke metadata update module 220 to update metadata tables 240. As discussed above with respect to FIG. 1, metadata tables 240 may be configured using the unique device identifier (of any device sending data elements that are to be stored in the time series data 250) as a primary key. Alternatively metadata tables 240 may be configured using a combination of the unique device identifier and a property of the device. Additionally, the "columns" of metadata tables 240 may be configured such that each column represents one of the time periods during which the data elements have been received. In some implementations, each column may represent the date/timestamp down to the hour. In some implementations, each column may represent the date/timestamp down to the day. In some implementations, each column may represent the date/timestamp down to the month. Each "cell" in the metadata table 240 may include an indication of the number of data elements received from the device during the corresponding time period. For example, if a device sends 50 data elements to be stored in the time series data 250 on Apr. 18, 2016 between the hours of 12:00 and 13:00, the cell for column 'Arp. 18, 2016 12:00' could contain a value of 50. An example structure of the metadata tables 240 is described in further detail below with respect to FIG. 3. Note that though embodiments are described with reference to metadata tables, other types of metadata structures, files and/or objects that describe numbers of data elements received from devices in different time ranges may also be used. Examples of such data structures, files and/or objects include lists, flat files, Metadata update module 220 may invoke metadata lookup module 210 to determine whether a metadata table entry is present in metadata tables 240 associated with the device identifier (or the device identifier and property combination) and the time period that the request was received. For example, if a device has already sent a data element to be stored in time series data 250 within the same time period (hour, day, month, etc.) used to configure the metadata table column, an entry for that device for that time period should already be present in the metadata table 240. Responsive to determining that an entry is present, metadata update module 220 may increase the indication of the number of data elements of the entry. Responsive to determining that a metadata table entry is not present, metadata update module 220 may add an entry to the metadata table 240 and set the indication of the number of elements of the entry.

Request processing module 205 may follow similar steps to those described above for subsequent requests to add additional data elements to time series data 250 for the same device identifier or device identifier and property combination (or other device identifiers or device identifier and property combinations). For example, request processing module 205 may receive a second data element from the device at a time that occurs after the time of the first request, invoke time series update module 235 to store the new data element in time series data 250, and invoke metadata update module 220 to add a new entry to metadata tables 240 that corresponds to the device identifier (or device identifier and property combination) and time period of the request or update an existing entry that corresponds to the device identifier (or device identifier and property combination) and time period of the request.

Request processing module 205 may also be responsible for receiving and processing requests for time series data stored in time series data 250. These requests may be received from devices (e.g., mobile devices, laptop computers, tablet computers, server computing devices, etc.), applications executing on the devices, or the like. Request processing module 205 may receive a request for time series data associated with a device (or device identifier and property combination). In embodiments, the request can include a device identifier associated with the device. Alternatively, the request can include a device identifier associated with the device and a property of the device. In some implementations, the request may be for time series data that includes a most recently received data element associated with the device (or device identifier and property combination). For example, a request may be received for the most recently received data element for a particular device. Additionally, or alternatively, the request may be for a collection of the most recently received data elements for a particular device (e.g., the 100 most recently received data elements). The request may be for the most recently received element (or a collection of the most recently received data elements) for a particular property of a particular device (e.g., the most recently received data element for a particular device setting attribute). The request may also be for all current settings of a device (e.g., a request for the most recent data element for each property associated with the device).

Request processing module 205 may invoke metadata lookup module 210 to determine that a metadata table is available that associates the device identifier (or device identifier and property combination) from the request with one or more time periods during which data associated with the device has been received. As noted above, the time periods may be the columns of the metadata table 240 and may be configured by hour, day, month, or in any similar manner. If a metadata table 240 is identified, metadata lookup module 210 may access a metadata table entry for the device identifier (or device identifier and property combination) that includes an indication of the number of data elements received at the time period of the metadata table 240 corresponding to the most recent time period (of the one or more time periods stored in the metadata table 240). For example, if the device identifier (or device identifier and property combination) specified in the request has a metadata table entry where the last column in the table with an indication of a number of data elements (e.g., has a cell with a value greater than zero) is for the time period with a date/timestamp of 'Apr. 19, 2016 13:00' this can indicate that the most recent time period for that device is 1:00 PM on Apr. 19, 2016.

Request processing module 205 may then invoke data store query module 215 to query time series data 250 for the requested time series data based on the time period identified in metadata tables 240 as the most recent time period. In the example above, data store query module 215 may take the time period information from the metadata table entry that represents the most recent time period (e.g., 'Apr. 19, 2016 13:00'), combine it with the device identifier (or device identifier and property combination) from the request, and construct the key value to use for accessing the time series data 250. Data store query module 215 may use this information to more efficiently identify the data elements for that device that have been most recently added to the time series data 250. Data store query module 215 may then identify the last column added to the time series data 250 for that time period to determine the single most recent data element during that time period. Alternatively, data store query module 215 may specify a number of data elements to retrieve from the time series data 250 for that time period (e.g., the five most recent data elements for that time period, the ten most recent data element for that time period, etc.).

In one embodiment, the request received by request processing module 205 may be for the most recent data element values for all device properties of a device or for the most recent data element values for a set of device properties that is less than all of the device properties. For example, the request may be for the most recent settings for a device (e.g., the most recently received temperature settings for a thermostat device). In such an embodiment, request processing module 205 may invoke metadata lookup module 210 and data store query module 215 as noted above for each device property. Different device properties may have been received at different times. Additionally, metadata tables 240 associated with the device may have separate rows for each property of the device. Accordingly, a different metadata table entry may be determined for each device property to determine a most recent time period in which a data element for that device property was received. The time series data 250 may then be queried based on each of the most recent time periods for the appropriate device and property combination.

Once the data elements have been retrieved from time series data 250, request processing module may invoke output module 225 to output a portion of the time series data (e.g., output 270), where the portion at least comprises the most recently received data element. For example, output module 225 may output the single most recent data element. Alternatively, output module 225 may output a number of data elements retrieved from the time series data 250 for that time period. In some implementations, output module 225 may transmit the data elements to a screen of a computing device, to an application executing on a computing device, to a component of the same server computing device that executes metadata manager 200, to a component of a different server computing device, to an application running on a requesting device, or the like.

In some implementations, output module 255 may use the information from metadata tables 240 to optimize pagination of the time series data when outputting multiple data elements to a requesting device, application, server computing device, etc. Output module 255 may determine a threshold number of data elements to be used for the output associated with the request. In some implementations, the threshold number of data elements may be received with the request for time series data the request may include properties associated with the requesting device). In some implementations, the threshold number of data elements may be stored in a configuration data store of authorized requesting parties (devices, applications, etc.) that stores properties associated with any device, application, etc. that is authorized to access the time series data 250.

Output module 255 may then determine that the indication of the number of data elements from the metadata table entry (or entries) associated with the request is greater than the threshold number of data elements. Output module 255 may then select the portion of the time series data from time series data 250 that includes no more than the threshold number of data elements from time series data retrieved from time series data 250. For example, the request may be received from a device with a maximum display page size of 60 for the device's display, and the metadata table entry for the time series data being requested contains an indication that the number of data elements stored for the requested time period is 100. Output module 255 may select no more than 60 data elements from the retrieved time series data as output for the device. Output module 255 may then transmit the 50 data elements to the device as output 270.

Output module 255 may then transmit any additional data elements to the device. In some implementations, output module 255 may transmit the additional data elements automatically. In some implementations, output module 255 may transmit the additional data responsive to receipt of an acknowledgement from the requesting party that the first page of output has been received by the requesting party. In some implementations, output module 255 may transmit the additional data responsive to receiving a subsequent request from the requesting party for the additional data elements. Output module 255 may determine the remaining number of data elements for the retrieved time series data, where the remaining number of data elements may be the number of data elements from the metadata table entry minus the threshold number. Using the example above, output module 255 may subtract 60 (the device threshold number) from 100 (the number of data elements in the metadata table entry) to compute a total of 40 remaining data elements that may be output to the requesting device.

Output module 255 may retrieve the remaining data elements from the time series data 250 by first determining a key value range for the remaining number of data elements in the time series data store using the information from the metadata table entry. Output module 255 may then select a remaining portion of the time series data that includes the remaining number of data elements using the key value range, and output the remaining portion of the time series data to the requesting party. In some implementations, output module 255 may retrieve all data elements for the time period at the time of the request, transmit the first portion to the requestor, and store the remaining data elements in a local storage area accessible to metadata manager 200. Output module 255 may then retrieve the remaining data elements from the local storage area for subsequent page output.

Metadata table generator 230 may be responsible for creating a new metadata table associated with the time series data 250. In some implementations, the amount of data stored in a single metadata table associated with time series data store may exceed a threshold size, and a second metadata table can be created to further optimize data retrieval. For example, if the first metadata table associated with the time series data 250 is configured using time period columns with date/timestamps narrowed to the hour, an additional metadata table may be created that is configured using time period columns with date/timestamps narrowed by day, by month, or in any similar manner. In some implementations, metadata table generator 230 may be invoked automatically by metadata table manager 200 based on determining that the size of the initial metadata table has exceeded a threshold size. Alternatively, metadata table generator 230 may be invoked by metadata manager 200 via a command to create a second metadata table received by request processing module 205 from a computing device connected to the server computing device executing metadata manager 200 (e.g., an administrator console for the network).

Metadata table generator 230 may determine that the first metadata table is indexed by a first time property. For example, as noted above, the first metadata table may be configured using time period columns with date/timestamps narrowed to the hour. Metadata table generator may then create a second metadata table that is indexed by a second time property that encompasses a larger time period than the first time property (e.g., the first time period is a subdivision of the second time property). For example, the second time property may be a time period narrowed to the day. The second metadata table may be created to associate the device identifier (or device identifier and property combination) with one or more additional time periods represented by the second time property during which data has been received from the device. For example, the second metadata table may be configured using time period columns with date/timestamps narrowed to the calendar day. Each cell entry of the second metadata table may thus contain an indication of the number of data elements received from the device during the calendar day represented by the table column.

Metadata table generator 230 may then generate an entry in the second metadata table according to the second time property that includes the indication of the number of data elements received from the device at the additional time period. Metadata table generator 230 may then analyze the contents of the first metadata table, sort the entries in the first metadata table by the second time property, determine a number of data elements received during each additional time period for the second time property, and generate additional entries in the second metadata table that associate the device identifier (or device identifier and property combination) with an indication of the number of data elements received during each additional time period.

For example, metadata table generator 230 may analyze a first metadata table configured with time period columns narrowed to the hour, and sort the entries by the day of the date/timestamp. Metadata table generator 230 may then determine the number of data elements received from each device identifier (or device identifier and property combination) in the first metadata table and for each day stored in the first metadata table. Metadata table generator 230 may then generate entries in a second metadata table that is configured with time period columns narrowed to the day, where each cell in the second metadata table contains an indication of the number of data elements received from the corresponding device identifier (or device identifier and property combination) during each day stored in the first metadata table.

Figure 3:
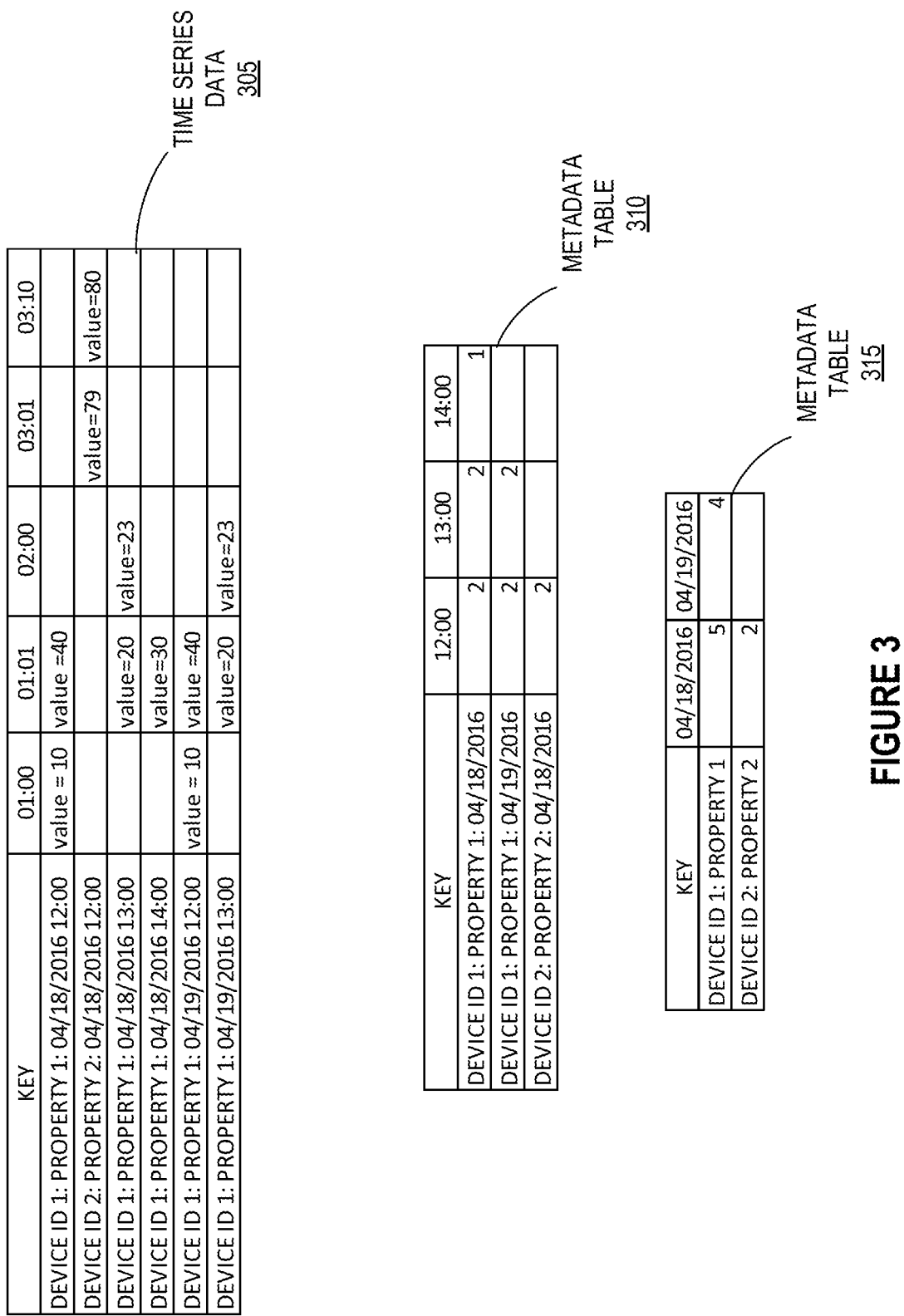
FIG. 3 is a diagram that illustrates examples of time series data with associated metadata tables, in accordance with an embodiment of the present disclosure.

FIG. 3 is a diagram 300 that illustrates examples of time series data with associated metadata tables. The diagram 300 depicts time series data 305 with two metadata tables 310 and 315 that may be created by a metadata manager (such as that described above with respect to FIGS. 1-2).

Time series data 305 illustrates a time series data store configured with a primary key that includes a device identifier, a device property, and a date/timestamp narrowed to the hour during which data elements were received from the corresponding device id/property combination. In other embodiments, time series data 305 may be configured with a primary key that includes the device identifier and date/timestamp without a corresponding device property. As shown in time series data 305, two devices have sent data ("DEVICE ID 1" and "DEVICE ID 2") across the span of two days (Arp. 18, 2016 and Apr. 19, 2016) during the time periods of 12:00 to 13:00, 13:00 to 14:00, and 14:00 to 15:00. DEVICE ID 1 has sent data for a "PROPERTY 1" and DEVICE ID 2 has sent data for a "PROPERTY 2". Each "column" in time series data 305 has been configured for the time period representing the hour and minute during which data elements were received.

As shown in time series data 305, during the time period of 12:00 to 13:00 on Apr. 18, 2016, two data elements for PROPERTY 1 were received from DEVICE ID 1. At 12:01:00, a data element with the value of '10' was received, and at 12:01:01, a data element with the value of '40' was received. During the same 12:00 to 13:00 time period, two data elements for PROPERTY 2 were received from DEVICE ID 2. At 12:03:01, a data element with the value of '79' was received, and at 12:03:01, a data element with the value of '80' was received. During the time period of 13:00 to 14:00 on Apr. 18, 2016, two data elements for PROPERTY 1 were received from DEVICE ID 1. At 13:01:01, a data element with the value of '20' was received, and at 13:02:00, a data element with the value of '23' was received. During the time period of 13:00 to 14:00 on Apr. 18, 2016, one data element for PROPERTY 2 was received from DEVICE ID 1. At 14:01:01, a data element with the value of '30' was received. During the time period of 12:00 to 13:00 on Apr. 19, 2016, two data elements for PROPERTY 1 were received from DEVICE ID 1. At 12:01:00, a data element with the value of '10' was received, and at 12:01:01, a data element with the value of '40' was received. During the time period of 13:00 to 14:00 on Apr. 19, 2016, two data elements for PROPERTY1 were received from DEVICE ID 1. At 13:01:01, a data element with the value of '20' was received, and at 13:02:00, a data element with the value of '23' was received.

Metadata table 310 illustrates of an example metadata table for time series data 305. Metadata table 310 is configured with a primary key that includes the device id of devices that have sent data elements to time series data 305, the device property, and a date/timestamp narrowed to the day during which data elements were received from the corresponding device id/property combination. In other embodiments, metadata table 310 may be configured with a primary key that includes the device identifier and date/timestamp without a corresponding device property. Metadata 310 has also been configured so that each column represents one of the time periods during which data elements stored in time series data 305 have been received. Particularly, the columns of metadata table 310 have been configured to represent the hour during which data elements stored in time series data 305 were received.

The first row of metadata table 310 contains entries for each time period during which data has been received from PROPERTY 1 of DEVICE ID 1 on Apr. 18, 2016. The cell for DEVICE ID 1 for time period '12:00' stores a value of '2', which represents the two data elements (10 and 40) stored for PROPERTY 1 of DEVICE ID 1 during that time period. The cell for time period '13:00' stores a value of '2', which represents the two data elements (20 and 23) stored for PROPERTY 1 DEVICE ID 1 during that time period. The cell for time period '14:00' stores a value of '1', which represents the data element (30) stored for PROPERTY 1 of DEVICE ID 1 during that time period.

The second row of metadata table 310 contains entries for each time period during which data has been received from PROPERTY 1 of DEVICE ID 1 on Apr. 19, 2016. The cell for time period '12:00' stores a value of '2', which represents the two data elements (10 and 40) stored for PROPERTY 1 of DEVICE ID 1 during that time period. The cell for time period '13:00' stores a value of '2', which represents the two data elements (20 and 23) stored for PROPERTY 1 of DEVICE ID 1 during that time period.

The third row of metadata table 310 contains entries for each time period during which data has been received from PROPERTY 2 of DEVICE ID 2. The cell for DEVICE ID 2 for time period 'Apr. 18, 2016 12:00' stores a value of '2', which represents the two data elements (10 and 40) stored for PROPERTY 2 of DEVICE ID 1 during that time period.

Metadata table 315 illustrates of an example of a second metadata table for time series data 305. In some implementations, metadata table 315 may be created by a metadata manager if the amount of data stored in metadata table 310 reaches a threshold size as further described above with respect to FIG. 2. Metadata table 315 is configured with a primary key that includes the device id and property of devices that have sent data elements to time series data 305. In other embodiments, metadata table 315 may be configured with a primary key that includes the device identifier without a corresponding device property. Metadata 315 has also been configured so that each column represents a time period property that is broader than that of metadata table 310 (e.g., the time period property of metadata table 310 is a subdivision of the time period property of metadata table 315). Particularly, the columns of metadata table 315 have been configured to represent the date/timestamp of data elements stored in time series data 305 narrowed down to the calendar day (e.g., the hourly time period of metadata table 310 being a subdivision of the daily time period of metadata table 315). Each cell entry of metadata table 315 may thus store an indication of the number of data elements received from a device during the calendar day represented by each table column.

The first row of metadata table 315 contains entries for each calendar day during which data has been received from PROPERTY 1 of DEVICE ID 1. The cell for PROPERTY 1 of DEVICE ID 1 for time period 'Apr. 18, 2016' stores a value of '5', which represents the two data elements (10 and 40) stored during the 12:00 hour of that day, the two data elements (20 and 23) stored during the 13:00 hour of that day, and the one data element (30) stored during the 14:00 hour of that day. The cell for PROPERTY 1 of DEVICE ID 1 for time period 'Apr. 19, 2016' stores a value of '4', which represents the two data elements (10 and 40) stored during the 12:00 hour of that day, and the two data elements (20 and 23) stored during the 13:00 hour of that day. The value of these cells may have been determined by the metadata table manager by sorting the entries of metadata table 310 and calculating the sum of the entries for each day.

Similarly, the second row of metadata table 315 contains entries for each calendar day during which data has been received from PROPERTY 2 of DEVICE ID 2. The cell for PROPERTY 2 of DEVICE ID 2 for time period 'Arp. 18, 2016' stores a value of '2', which represents the two data elements (79 and 80) stored during the 12:00 hour of that day.

FIGS. 4-7 are flow diagrams showing various methods for utilizing metadata tables for time-series data management. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a metadata manager, such as metadata manager 120 of server computing device 110 in FIG. 1 and/or metadata manager 200 in FIG. 2.

Figure 4:
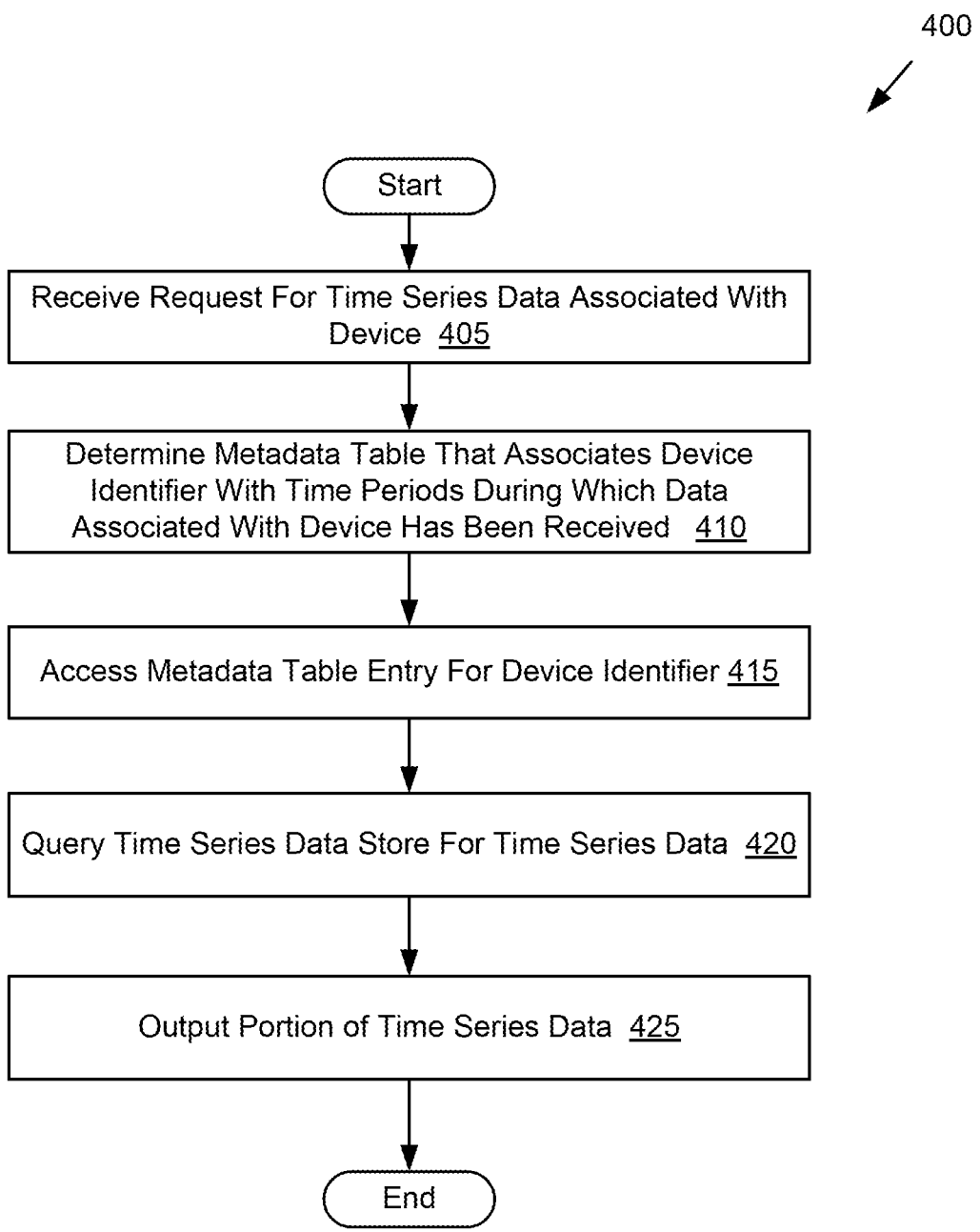
FIG. 4 is a flow chart of an example method for time series data management using metadata tables, in accordance with an embodiment of the present disclosure.

FIG. 4 is a flow chart of an example method 400 for time series data management using metadata tables. At block 405 of method 400, processing logic receives a request for time series data associated with a device. The request may include a device identifier associated with the device. The request may also include a particular property of the device. For example, the request may be for a temperature setting for a particular thermostat device. The request may also be for the current values for one or more device property associated with a particular device. The time series data can include a most recently received data element associated with the device. The time series data can additionally or alternatively include multiple data elements, where one or more of the data elements has an associated device property. Accordingly, the time series data can include a most recently received data element for each device property of the device). At block 410, processing logic determines a metadata table that associates the device identifier (or the device identifier and property combination) of the device with one or more time periods during which data associated with the device has been received.

At block 415, processing logic accesses a metadata table entry for the device identifier (or the device identifier and property combination). The metadata table entry can include an indication of the number of data elements received at a first time period that is a most recent time period of the one or more time periods. At block 420, processing logic queries a time series data store for the time series data based on the first time period.

In one embodiment the request received at block 405 is for the most recent data element values for all device properties of a device or for the most recent data element values for a set of device properties that is less than all of the device properties. For example, the request may be for the current settings for a device (e.g., the most recently received temperature settings for a thermostat device). In such an embodiment, the operations of blocks 415-420 are performed separately for each device property. Different device properties may have been received at different times. Additionally, the metadata table associated with the device may have separate rows for each property of the device. Accordingly, a different metadata table entry may be determined for each device property to determine a most recent time period in which a data element for that device property was received. The time series data store may then be queried based on each of the most recent time periods for the appropriate device and property combination.

At block 425, processing logic outputs a portion of the time series data obtained at block 420, where the portion at least comprises the most recently received data element (or most recently received data element for each of the device properties). After block 425, the method of FIG. 4 terminates.

Figure 5:
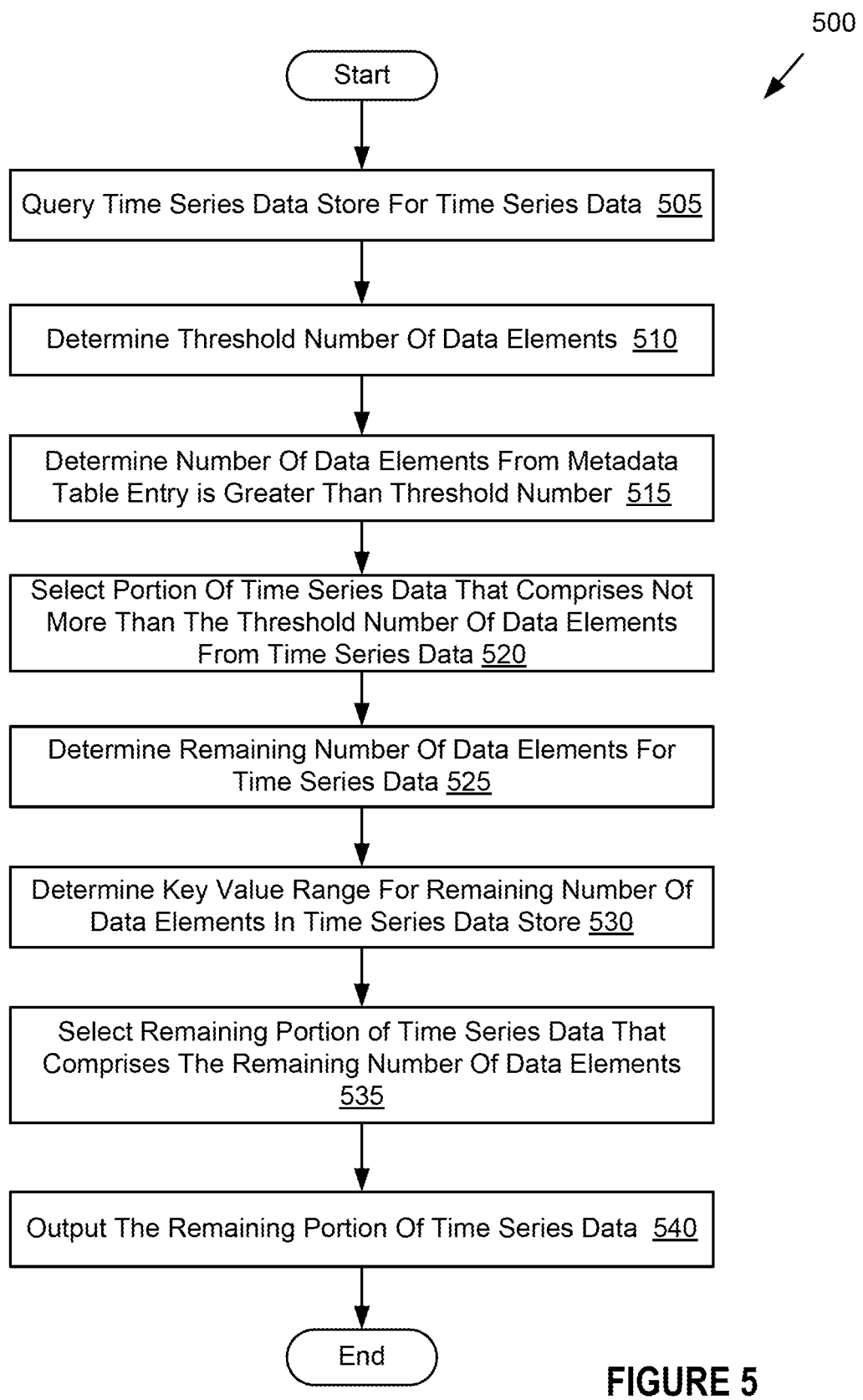
FIG. 5 is a flow chart of an example method for managing pagination of output of data elements, in accordance with an embodiment of the present disclosure.

FIG. 5 is a flow chart of an example method 500 for managing pagination of output of data elements. At block 505 of method 500, processing logic queries a time series data store for time series data associated with a device. At block 510, processing logic determines a threshold number of data elements. At block 515, processing logic determines that the number of data elements from a metadata table entry associated with the device is greater than the threshold number of data elements. At block 520, processing logic selects a portion of the time series data that comprises not more than the threshold number of data elements from the time series data.

At block 525, processing logic determines a remaining number of data elements for the time series data. The remaining number of data elements may be the number of data elements from the metadata table entry minus the threshold number. At block 530, processing logic determines a key value range for the remaining number of data elements in the time series data store. At block 535, processing logic selects the remaining portion of time series data that comprise the remaining number of data elements from the time series data using the key value range. At block 540, processing logic outputs the remaining portion of time series data. After block 540, the method of FIG. 5 terminates.

Figure 6:
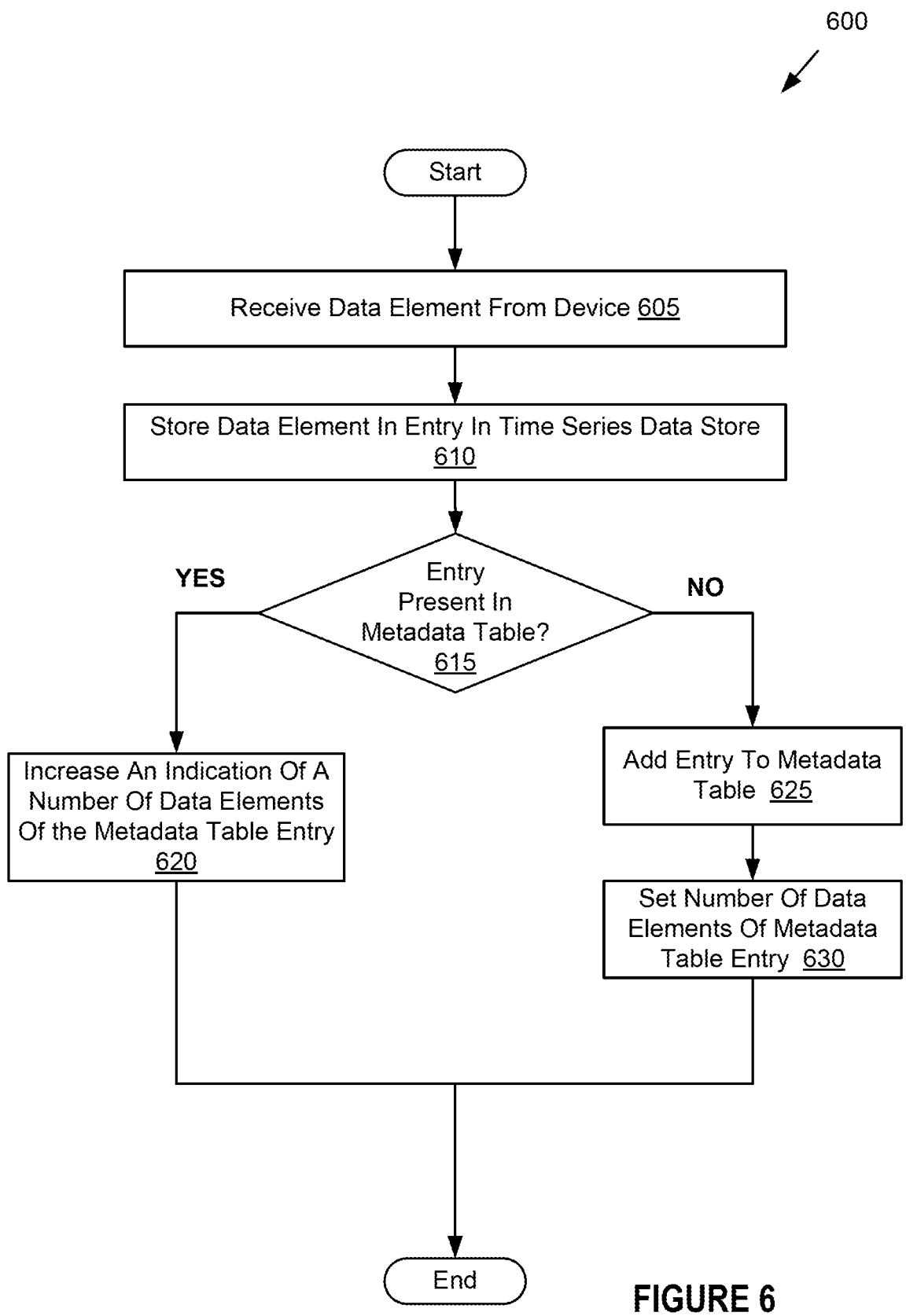
FIG. 6 is a flow chart of an example method for updating a metadata table, in accordance with an embodiment of the present disclosure.

FIG. 6 is a flow chart of an example method 600 for updating a metadata table. At block 605 of method 600, processing logic receives a data element from a device. At block 610, processing logic stores the data element in an entry in a time series data store. The entry can be associated with the device identifier (or the device identifier and property combination) of the device and the time that the data element was received at block 605. At block 615, processing logic determines whether an entry is present a metadata table associated with the device identifier (or the device identifier and property combination) and the time the data element was received. If so, processing continues to block 620. Otherwise, processing logic proceeds to block 625. At block 620, processing logic increases an indication of the number of data elements of the metadata table entry associated with the device identifier (or the device identifier and property combination) and the time the data element was received. After block 620, the method of FIG. 6 terminates.

At block 625, processing logic adds a new entry to the metadata table associated with the device identifier (or the device identifier and property combination) and the time the data element was received. At block 630, processing logic sets the number of data elements of the metadata table entry. After block 630, the method of FIG. 6 terminates.

Figure 7:
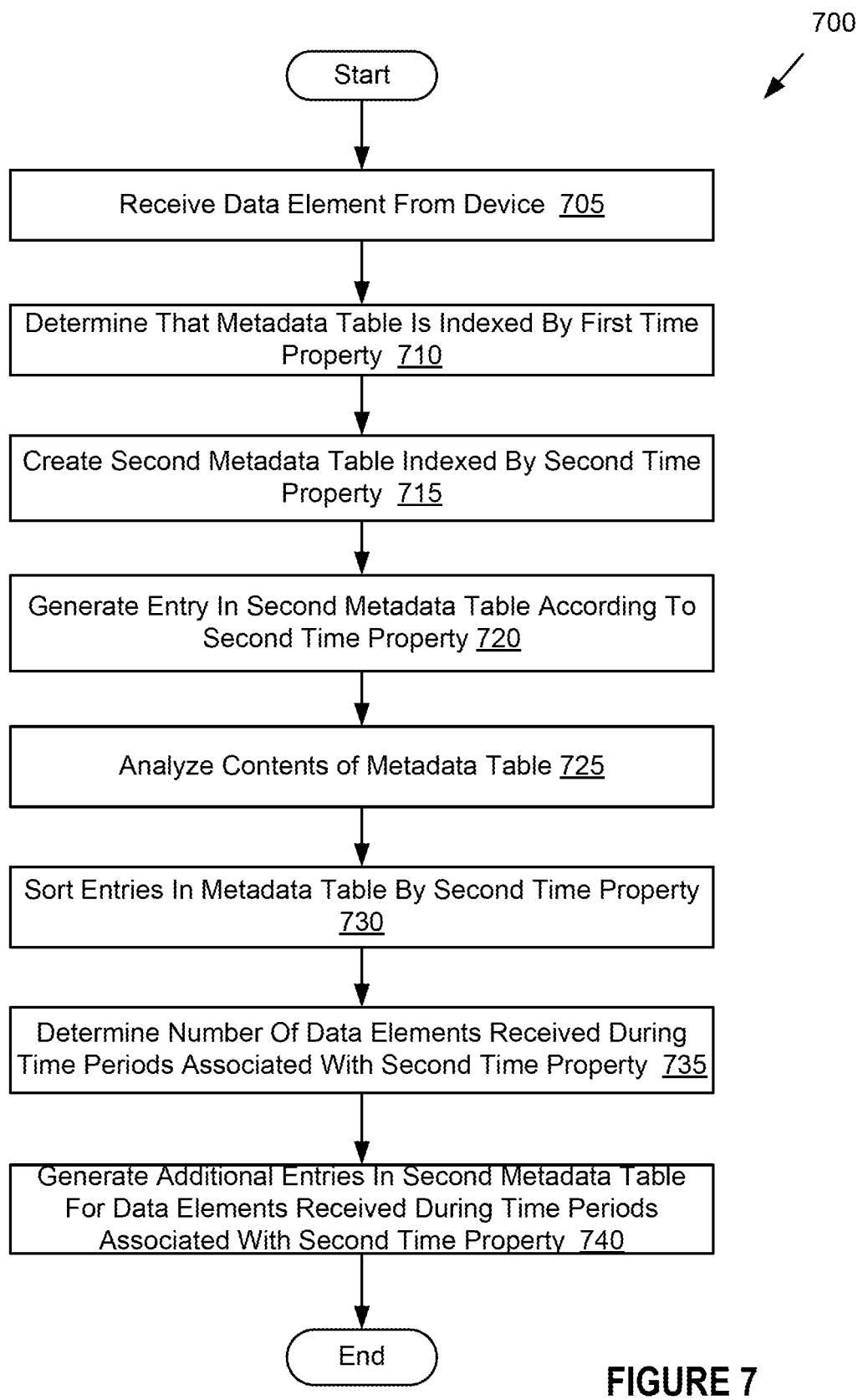
FIG. 7 is a flow chart of an example method for creating a metadata table, in accordance with an embodiment of the present disclosure.

FIG. 7 is a flow chart of an example method 700 for creating a metadata table. At block 705 of method 700, processing logic receives a data element from a device. At block 710, processing logic determines that a metadata table is indexed by a first time property. The metadata table can associate the device identifier (or the device identifier and property combination) of the device with one or more time periods during which data associated with the device has been received. At block 715, processing logic creates a second metadata table that is indexed by a second time property. At block 720, processing logic generates an entry in the second metadata table according to the second time property.

At block 725, processing logic analyzes the contents of the first metadata table. At block 730, processing logic sorts the entries in the first metadata table by the second time property. At block 735, processing logic determines the number of data elements received during each time period associated with the second time property. At block 740, processing logic generates additional entries in the second metadata table. Each entry in the second metadata table may associate the device identifier (or the device identifier and property combination) of a device with an indication of the number of data elements received during each additional time period. After block 740, the method of FIG. 7 terminates.

Figure 8:
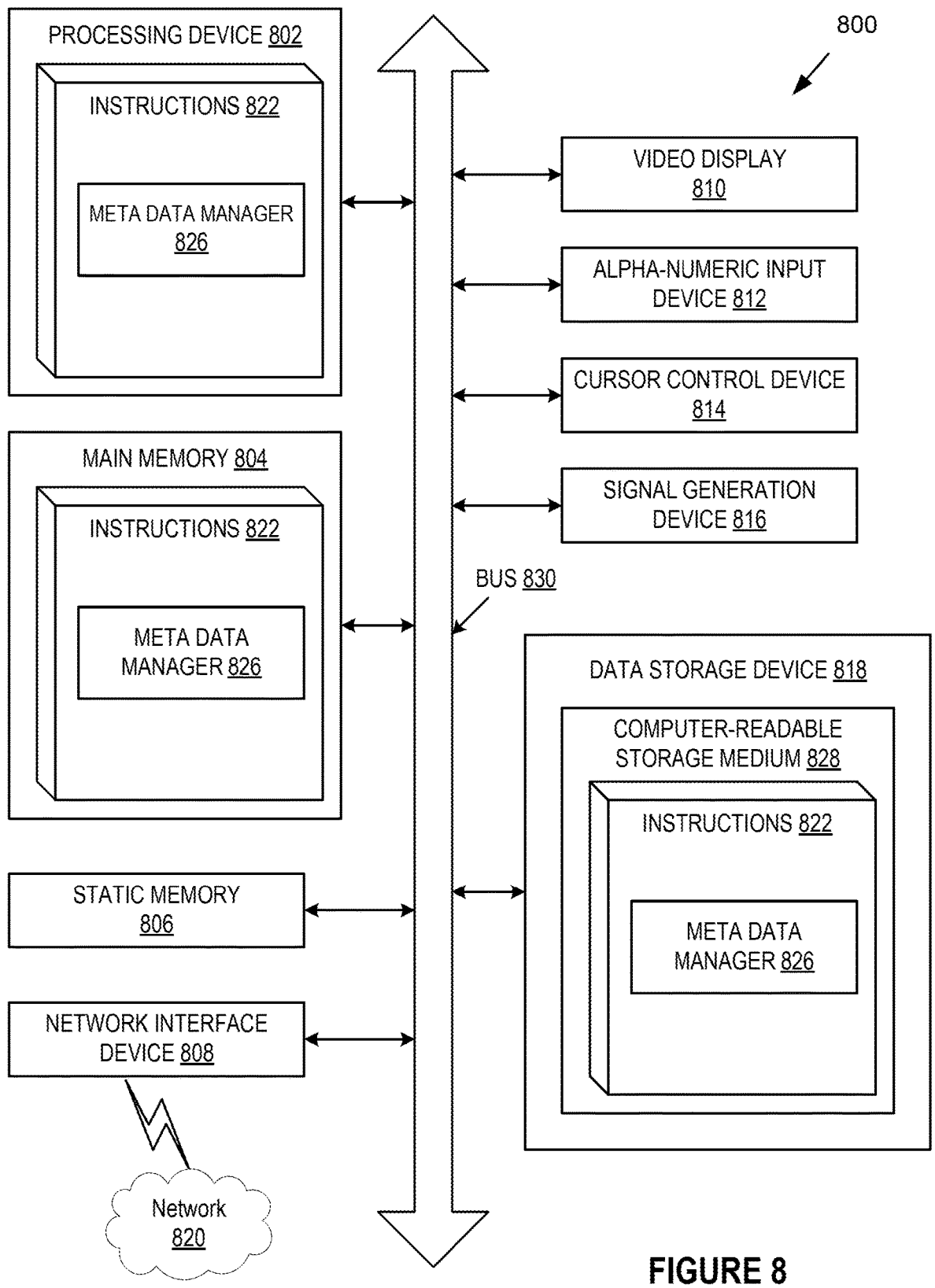
FIG. 8 illustrates a block diagram of one embodiment of a computing device.

FIG. 8 illustrates a diagrammatic representation of a machine in the example form of a computing device 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a computer-readable storage medium) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The computer-readable storage medium 828 may also be used to store a metadata manager 826 (as described with reference to FIGS. 1-2), and/or a software library containing methods that call a remote control application. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits in a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "accessing", "querying", "outputting", "selecting", "generating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device, a request for first time series data associated with a device, wherein the request comprises a device identifier associated with the device, and wherein the first time series data comprises a most recently received data element associated with the device;
    determining, by the processing device, a metadata table that associates the device identifier with one or more time periods during which data associated with the device has been received and stored in a time series data store;
    identifying, by the processing device, a first time period of the one or more time periods based on a most recent time period that has an indication of a number of data elements received from the device that exceeds a threshold, wherein the first time period represents a most recent time period during which the data associated with the device has been receive;
    accessing, by the processing device, a metadata table entry for the device identifier corresponding to the first time period of the one or more time periods;
    querying, by the processing device, the time series data store for the first time series data based on the first time period; and
    outputting a portion of the first time series data, wherein the portion at least comprises the most recently received data element.

2. The method of claim 1, further comprising:
    determining a threshold number of data elements;
    determining that the number of data elements from the metadata table entry is greater than the threshold number of data elements; and
    selecting the portion of the first time series data that comprises not more than the threshold number of data elements from the first time series data.

3. The method of claim 2, wherein outputting at least the portion of the first time series data comprises transmitting at least the portion of the first time series data to a computing device, and wherein the threshold number of data elements comprises a maximum number of data elements in a page for the computing device.

4. The method of claim 2, further comprising:
    determining a remaining number of data elements for the first time series data, wherein the remaining number comprises the number of data elements from the metadata table entry minus the threshold number;
    determining a key value range for the remaining number of data elements in the time series data store;
    selecting a remaining portion of the first time series data that comprises the remaining number of data elements from the first time series data using the key value range; and
    outputting the remaining portion of the first time series data.

5. The method of claim 1, wherein the request is received at a first time, the method further comprising:
    receiving a second data element from the device at a second time that occurs after the first time;
    storing the second data element in an entry in the time series data store, the entry associated with the device identifier and the second time;
    responsive to determining that a second entry is present in the metadata table associated with the device identifier and the second time, increasing an indication of a second number of data elements of the second entry; and
    responsive to determining that the second entry is not present in the metadata table, adding the second entry to the metadata table and setting the second number of data elements of the second entry.

6. The method of claim 5, further comprising:
    determining that the metadata table is indexed by a first time property;
    creating a second metadata table that is indexed by a second time property, wherein the first time property is a subdivision of the second time property, and wherein the second metadata table associates the device identifier with one or more additional time periods during which data has been received from the device; and
    generating an entry in the second metadata table according to the second time property, wherein the entry in the second metadata table comprises an indication of a number of data elements received from the device at a first additional time period of the one or more additional time periods.

7. The method of claim 6, wherein the first time property is associated with an hourly time period and the second time property is associated with a daily time period, wherein the first additional time period is a first day during which the second data element was received, and wherein the entry in the second metadata table comprises an indication of the number of data elements received during the first day.

8. The method of claim 7, further comprising:
    analyzing contents of the metadata table;
    sorting the entries in the metadata table by the second time property;

determining a number of data elements received during each additional time period for the second time property; and generating additional entries in the second metadata table, wherein each entry associates the device identifier with an indication of the number of data elements received during each additional time period.

9. The method of claim 1, wherein the device comprises a plurality of device properties, wherein the first time series data comprises a plurality of data elements, and wherein one or more data elements of the plurality of data elements has an associated device property of the plurality of device properties.

10. The method of claim 9, wherein the request is for current values of the plurality of device properties, and wherein a metadata table entry in the metadata table associates the device identifier and a particular device property of the plurality of device properties with the one or more time periods during which data associated with the device identifier and the particular device property have been received, the method further comprising:

performing a plurality of accesses of the metadata table based on the plurality of device properties, wherein each of the plurality of accesses is associated with a device property of the plurality of device properties and returns a most recent time period during which data associated with the device property has been received, wherein querying the time series data store comprises querying the time series data store for the plurality of device properties, and wherein outputting the portion of the first time series data comprises outputting the most recently received data element for each of the plurality of device properties.

11. The method of claim 1, wherein the request is received at a first time, the method further comprising:

receiving a new data element from the device at a third time that occurs before the first time, wherein the new data element is the most recently received data element;

storing the new data element in a new entry in the time series data store, the new entry associated with the device identifier and the third time;

responsive to determining that the metadata table entry is present in the metadata table associated with the device identifier and the third time, increasing the indication of the number of data elements of the entry; and responsive to determining that the metadata table entry is not present in the metadata table, adding the entry to the metadata table and setting the number of data elements of the entry.

12. A non-transitory computer readable storage medium having instructions that, when executed by a processing device, cause the processing device to perform operations comprising:

receiving a request for first time series data associated with a device, wherein the request comprises a device identifier associated with the device, and wherein the first time series data comprises a most recently received data element associated with the device;

determining a metadata table that associates the device identifier with one or more time periods during which data associated with the device has been received and stored in a time series data store;

identifying a first time period of the one or more time periods based on a most recent time period that has an indication of a number of data elements received from the device that exceeds a threshold, wherein the first time period represents a most recent time period during which the data associated with the device has been received;

accessing a metadata table entry for the device identifier corresponding to the first time period of the one or more time periods;

querying, by the processing device, the time series data store for the first time series data based on the first time period; and outputting a portion of the first time series data, wherein the portion at least comprises the most recently received data element.

13. The non-transitory computer readable storage medium of claim 12, the operations further comprising:

determining a threshold number of data elements;

determining that the number of data elements from the metadata table entry is greater than the threshold number of data elements; and selecting the portion of the first time series data that comprises not more than the threshold number of data elements from the first time series data.

14. The non-transitory computer readable storage medium of claim 13, the operations further comprising:

determining a remaining number of data elements for the first time series data, wherein the remaining number comprises the number of data elements from the metadata table entry minus the threshold number;

determining a key value range for the remaining number of data elements in the time series data store;

selecting a remaining portion of the first time series data that comprises the remaining number of data elements from the first time series data using the key value range; and outputting the remaining portion of the first time series data.

15. The non-transitory computer readable storage medium of claim 13, wherein the request is received at a first time, the operations further comprising:

receiving a second data element from the device at a second time that occurs after the first time;

storing the second data element in an entry in the time series data store, the entry associated with the device identifier and the second time;

responsive to determining that a second entry is present in the metadata table associated with the device identifier and the second time, increasing an indication of a second number of data elements of the second entry; and responsive to determining that the second entry is not present in the metadata table, adding the second entry to the metadata table and setting the second number of data elements of the second entry.

16. The non-transitory computer readable storage medium of claim 13, the operations further comprising:

determining that the metadata table is indexed by a first time property;

creating a second metadata table that is indexed by a second time property, wherein the first time property is a subdivision of the second time property, and wherein the second metadata table associates the device identifier with one or more additional time periods during which data has been received from the device; and generating an entry in the second metadata table according to the second time property, wherein the entry in the second metadata table comprises an indication of a number of data elements received from the device at a first additional time period of the one or more additional time periods;

analyzing contents of the metadata table;

sorting the entries in the metadata table by the second time property;

determining a number of data elements received during each additional time period for the second time property; and generating additional entries in the second metadata table, wherein each entry associates the device identifier with an indication of the number of data elements received during each additional time period.

17. A system comprising:

a memory; and a processing device coupled to the memory, wherein the processing device is to:

receive, by the processing device, a request for first time series data associated with a device, wherein the request comprises a device identifier associated with the device, and wherein the first time series data comprises a most recently received data element associated with the device;

determine, by the processing device, a metadata table that associates the device identifier with one or more time periods during which data associated with the device has been received and stored in a time series data store;

identify, by the processing device, a first time period of the one or more time periods based on a most recent time period that has an indication of a number of data elements received from the device that exceeds a threshold, wherein the first time period represents a most recent time period during which the data associated with the device has been receive;

access, by the processing device, a metadata table entry for the device identifier corresponding to the first time period of the one or more time periods;

query, by the processing device, the time series data store for the first time series data based on the first time period; and output a portion of the first time series data, wherein the portion at least comprises the most recently received data element.

18. The system of claim 17, wherein the processing device is further to:

determine a threshold number of data elements;

determine that the number of data elements from the metadata table entry is greater than the threshold number of data elements;

select the portion of the first time series data that comprises not more than the threshold number of data elements from the first time series data;

determine a remaining number of data elements for the first time series data, wherein the remaining number comprises the number of data elements from the metadata table entry minus the threshold number;

determine a key value range for the remaining number of data elements in the time series data store;

select a remaining portion of the first time series data that comprises the remaining number of data elements from the first time series data using the key value range; and output the remaining portion of the first time series data.

19. The system of claim 17, wherein the request is received at a first time, wherein the processing device is further to:

receive a second data element from the device at a second time that occurs after the first time;

store the second data element in an entry in the time series data store, the entry associated with the device identifier and the second time;

responsive to determining that a second entry is present in the metadata table associated with the device identifier and the second time, increase an indication of a second number of data elements of the second entry; and responsive to determining that the second entry is not present in the metadata table, add the second entry to the metadata table and setting the second number of data elements of the second entry.

20. The system of claim 17, wherein the processing device is further to:

determine that the metadata table is indexed by a first time property;

create a second metadata table that is indexed by a second time property, wherein the first time property is a subdivision of the second time property, and wherein the second metadata table associates the device identifier with one or more additional time periods during which data has been received from the device; and generate an entry in the second metadata table according to the second time property, wherein the entry in the second metadata table comprises an indication of a number of data elements received from the device at a first additional time period of the one or more additional time periods;

analyze contents of the metadata table;

sort the entries in the metadata table by the second time property;

determine a number of data elements received during each additional time period for the second time property; and generate additional entries in the second metadata table, wherein each entry associates the device identifier with an indication of the number of data elements received during each additional time period.

* * * * *